United States Patent [19]

Peille

[11] 4,268,236
[45] May 19, 1981

[54] DISTRIBUTION AND CALIBRATION SYSTEM FOR EXPANDED PLASTIC PANEL MANUFACTURE

[75] Inventor: Jean M. R. Peille, Esperaza, France

[73] Assignee: Societe Industrielle de Stratifies, Esperaza, France

[21] Appl. No.: 111,979

[22] Filed: Jan. 14, 1980

[30] Foreign Application Priority Data

Jan. 15, 1979 [FR] France .............................. 79 00847

[51] Int. Cl.³ ........................................... B29D 27/04
[52] U.S. Cl. ................................. 425/115; 264/46.2; 425/224; 425/817 C
[58] Field of Search ..................... 264/46.2, DIG. 84; 425/224, 110, 817 C

[56] References Cited

U.S. PATENT DOCUMENTS

| | | | |
|---|---|---|---|
| 3,644,606 | 2/1972 | Auge et al. | 264/46.2 |
| 3,837,771 | 9/1974 | Kolakowski et al. | 425/110 |
| 3,942,925 | 3/1976 | Schmitzer et al. | 425/224 X |
| 4,082,824 | 4/1978 | Del Carpio | 264/DIG. 84 |
| 4,108,585 | 8/1978 | Proksa et al. | 425/224 X |

FOREIGN PATENT DOCUMENTS

| | | |
|---|---|---|
| 2449107 | 4/1976 | Fed. Rep. of Germany ... 264/DIG. 84 |
| 1525046 | 5/1968 | France . |
| 1550293 | 12/1968 | France . |

*Primary Examiner*—Philip Anderson
*Attorney, Agent, or Firm*—Weiser, Stapler & Spivak

[57] ABSTRACT

A distribution and calibrating system for an expandable reactant mixture. The system comprises a reference plate, a distribution plate associated with a calibrating bar and means for modifying a particular profile of the distribution plate for principal use in the continuous fabrication of rigid foam panels.

9 Claims, 3 Drawing Figures

DISTRIBUTION AND CALIBRATION SYSTEM FOR EXPANDED PLASTIC PANEL MANUFACTURE

The invention relates to a distributor-calibrator system of liquid mixture useable for different types of installations adapted for the continuous manufacture of panels whose core is obtained starting from expandable synthetic materials and which assume the form of a rigid foam after reaction.

One of the foams most widely used in the manufacture of such panels is polyurethane foam.

The invention relates more particularly to a type of installation in which the expandable synthetic material is delivered by pouring, in a liquid state, upon a support sheet which may or may not be liquid-tight and which moves along continuously. In such installations a second sheet which may also be liquid-tight or not is applied on top of the synthetic material delivered by pouring. This makes it possible to subject said material to a mechanical calibrating action when that material is still present in a liquid state.

Before discussing the principal embodiments of the invention, it is in order to recall the difficulties which are encountered when utilizing previously known systems by means of which the synthetic material was delivered and calibrated.

To begin with, there are known two types of pouring systems for depositing the liquid reactant upon the continuously-moving support sheet.

A first type of pouring system is described in U.S. Pat. No. 3,837,771. It takes the form of a pouring head provided with a reciprocating movement transverse to the direction of the movement of the support sheet. The synthetic material which is poured upon the support sheet exhibits a relatively high viscosity. As a result, there is formed between the zigzag paths defined by the alternating pouring, excess thickness and hollows relative to the average height of the layer of deposited material.

One might think that these distribution problems are without effect upon the quality of the finished produt in view of the fact the deposited layer of material is subsequently subjected to a calibrating action.

However, experience shows that the finished products obtained by a pouring system of this type exhibit considerable irregularities of thickness and localized dimensional irregularities of the cell structure of the expanded material.

From U.S. Pat. No. 3,837,771 there is also known a calibrating system which follows the pouring system and which takes the form of a roller of high precision whose spacing is very accurately adjustable relative to a fixed surface.

Despite this system the finished panels exhibit the abovementioned defects.

A second type of pouring system consists of multiple fixed pouring heads distributed along a line perpendicular to the direction of movement of the support sheet.

On this support sheet there forms at the level of the pouring heads, separate parallel pouring lines separated by uncovered regions. The pouring lines progressively widen, merge, and form a coating which covers the entire width of the support strip. Such a system is described in French Pat. Nos. 1,525,046 and 1,550,293.

In these two described pouring systems, the layer of synthetic material has excess thickness in the direction of extension of the pouring lines. In each of the above French patents there is also described a calibrating system consisting of two fixed surfaces, spaced from each other and positioned so as to converge at an angle less than 10°.

Regardless of which pouring system is used, it develops that it is not possible to control the regularity of distribution of the liquid synthetic material, upstream from the calibrating point, consisting either of the peak of the angle of less than 10° in the case of a calibrating system formed by two converging planes, or of the point of tangency in the case of a calibrating system formed by a plane and a roller.

However it has been discovered, surprisingly, that the distribution of the synthetic material deposited upstream from the calibrating point played a very important role in the characteristics of the finished product. Likewise it has been discovered that the quantity of liquid synthetic material delivered by the calibrating system depends to a large extent upon this distribution.

From these discoveries it follows that it is essential in order to obtain uniform calibration across the width of the object being formed and consequently a panel of fixed thickness after expansion, to be able to control this distribution. However the systems representing the known technology as described above did not permit obtaining such a result.

Accordingly, the present invention has as its principal object to overcome these drawbacks of previously known systems by means of a system which provides simultaneously, on the one hand, uniform distribution of the liquid reacting mixture upstream from the calibrating point, and, on the other hand, high precision calibration of this mixture in order to obtain finished panels of uniform thickness.

These and other objects are achieved in accordance with the invention by means of a mixture distributing and calibrating system for liquid reaction mixture, for continuous fabrication installations of expandable synthetic material panels, installations in which the expandable synthetic material is deposited by pouring in the liquid state upon a support sheet, which may or may not be liquid-tight and is in continuous movement, the said material being properly deposited by a pouring system comprising multiple fixed pouring heads distributed along a line perpendicular to the direction of advance of said support sheet. The said installations further comprise means for applying upon the synthetic material deposited by pouring a cover sheet which may or may not be liquid-tight, the support sheet and the cover sheet making it possible to subject this synthetic material to a calibrating action which this material is still in the liquid state.

The system is characterized in that is comprises, in combination, on the one hand, a reference plate below the plane of movement of the support sheet upon which that sheet travels, and on the other hand, an elastically deformable distribution plate above the plane of travel of the support sheet and of the cover sheet. This plate is adjustable in spacing and inclination relative to the reference plate. This distribution plate is positioned immediately upstream from a calibrating bar which is adjustable in spacing relative to either one of said plates.

In a preferred embodiment, the calibrating bar is positioned above the plane of movement of the support sheet and is adjustable in spacing relative to the reference plate.

In accordance with a principal embodiment of the invention, the distribution plate positioned above the plane of advance of the cover sheet comprises, in the direction of the pouring lines delivered by the pouring heads, adjusting means adapted to locally deform said distribution plate along a line transverse to the direction of passage of the support and cover sheets of the panel being formed. This deforming means is such that the adjustable local deformation of the plate equalizes the local excess thicknesses attributable to the pouring lines from the pouring heads. As a result there is obtained upstream from the calibrating bar a layer of synthetic material which is precalibrated, of constant thickness, and completely homogeneous.

In accordance with a structural embodiment of the invention, the reference plate, the distribution plate, and the calibrating bar are mounted respectively as follows. The first is mounted between the longitudinal beams of a first chassis connected to a fixed support frame through the intermediary of jacks positioned between said fixed frame and the said longitudinal beams of the reference plate chassis. The distribution plate and the calibrating bar, on the other hand, are suspended between the longitudinal beams and the transverse beams of a second chassis, said second chassis being connected pivotally to the first chassis in such manner that the angular position of the second chassis relative to the first can be adjusted. As a result, it is possible to obtain simultaneously an adjustment of the distance which separates the calibrating bar and the distribution plate from the reference plate.

The adjustment of the angular position between the first and the second chassis is obtained by means of two micrometer stops positioned at the ends of the longitudinal support beams of the second chassis, opposite the pivots which connect the first and the second chassis, the said stops bearing upon the corresponding extremities of the longitudinal beams of the first chassis.

In another structural embodiment, the distribution plate is connected to one of these extremities transverse to the calibrating bar by means of connecting brackets capable of oscillating about the suspension axis of said bar. The other transverse extremity of the distribution plate is connected by means of adjusting screws positioned between said extremity and the corresponding end transverse member of the second pivoting chassis.

In accordance with a preferred embodiment, the adjusting means for locally deforming the distribution plate consists of micrometer-adjusting pins having an extremity attached to the plate, the other extremity being controlled by a screw guided within a transverse member of the second pivoting chassis, this transverse member being positioned between the end transverse members of the same chassis above the distribution plate.

In accordance with another embodiment of the invention the distribution plate is made of transparent material which is elastically deformable, particularly glass. In a preferred embodiment the distribution plate consists of two flexible leaves, which are transparent and separated by a space providing a circulation chamber for liquid refrigerant.

There will be observed the particular advantage provided by constructing the distribution plate of transparent material, since this permits visual observation through the distribution plate of the equalizing function and consequently the possibility, if necessary, to vary this equalization in very fine and precise manner by the adjustment settings for the local deformations of the plate.

The invention also encompasses installations which are provided with a system which corresponds to or is similar to the foregoing.

Other characteristics and advantages will appear from the detailed description below of an embodiment of the distributing and calibrating system shown by way of example in the attached drawings in which.

Figure 1:
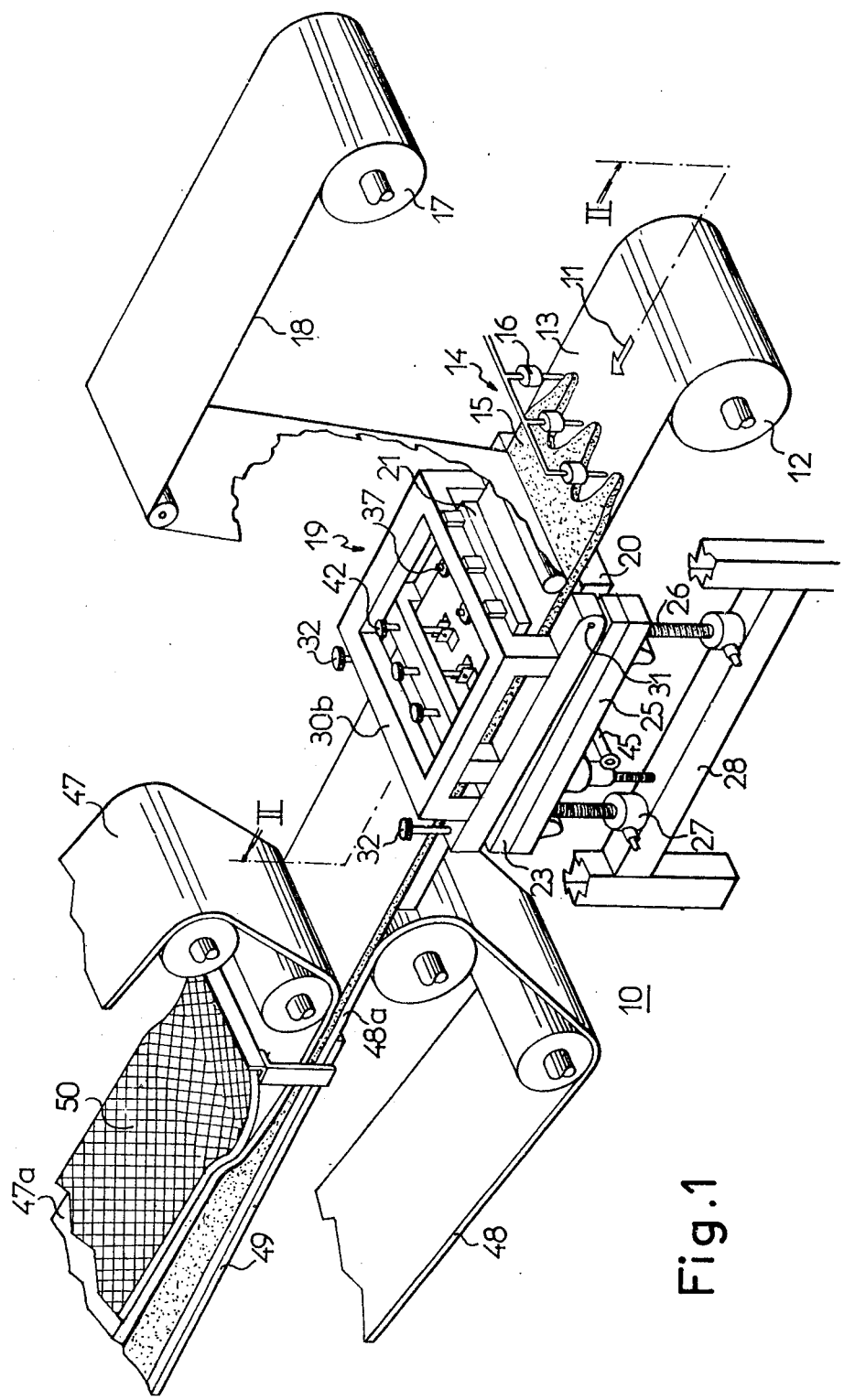
FIG. 1 is a perspective view with certain portions broken away of a continuous panel production system provided with a distributing and calibrating system according to the invention.

In accordance with the invention as illustrated in FIG. 1, the invention relates particularly to continuous manufacturing systems of panels and shows by way of example an installation of this type. The installation is designated by the general reference numeral 10. This installation includes, from upstream to downstream, taken with reference to the direction of forward movement of the components of the panel being formed, a first roller 12 which delivers a support sheet 13 moving continuously and preferably along a substantially horizontal plane. The support sheet 12 may be liquid-tight or not, depending upon the type of finished panels which it is desired to obtain. Thus, in some cases, it may be advantageous to use a support sheet of non-woven material which is capable of being progressively penetrated by the synthetic material constituting the core of the panel, so that the non-woven material becomes adhesive and serves as the connecting means, for example, with a rigid facing.

Following the roller which delivers the support sheet 13, the installation comprises a pouring system 14 for delivering in liquid form an expandable reactant mixture 15. This mixture is delivered by pouring heads 16, preferably fixed and distributed transversely relative to the direction of movement of support sheet 13. In the example illustrated, three pouring heads form upon support sheet 13 three corresponding pouring lines which progressively widen and merge together in order to then form a continuous layer which extends across the entire width of the support sheet.

The installation includes a second delivery roller 17 from which there unwinds continuously a cover sheet 18 which is applied to the top of the layer of synthetic material 15 immediately after the pouring heads 16. The system formed by the synthetic material layer clad on its two faces with facing sheet then penetrates into the distributing and calibrating system designated by general reference numeral 19 which will be discussed in detail below.

Figure 2:
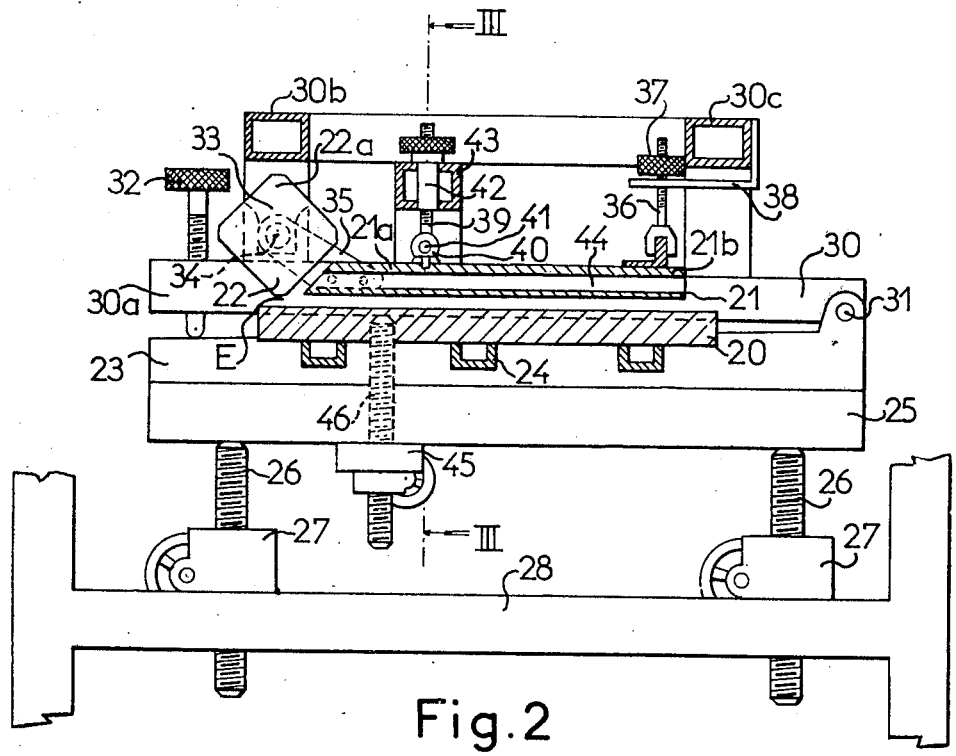
FIG. 2 shows to a larger scale a longitudinal section of the system of FIG. 1 taken along II—II.
Figure 3:
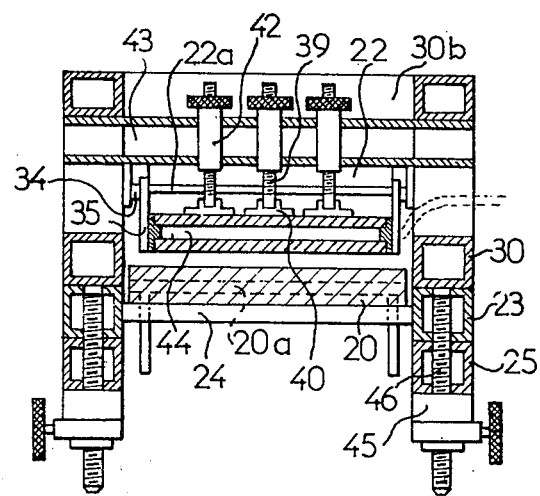
FIG. 3 shows a transverse section of the system of FIG. 2 taken along III—III.

Since not all of the constituent elements of this distributing and calibrating system are visible in FIG. 1, reference will also be made to FIGS. 2 and 3, particularly as regards the respective positioning of the calibrating bar and the distribution plate relative to their support chassis.

The distribution plate relative to their support chassis. movement of support sheet 13 a reference plate 20 upon which said support sheet continuously moves. Above the plane of movement of support sheet 13 and cover sheet 18 the system comprises a distribution plate 21, which is elastically deformable and adjustable in spacing and inclination relative to reference plate 20. Distribution plate 21 is positioned immediately upstream from a calibrating bar 22 which is adjustable in displacement relative to reference plate 20. Reference plate 20 is positioned between the longitudinal beams of a first chassis and is united with the longitudinal beams of that chassis by means of transverse members 24. The longitudinal members of the first chassis themselves rest upon support beams 25, which rest upon moveable shafts 26 of jacks 27, which are united with a stationary frame 28. In this manner first chassis 23 may be adjusted to desired height either horizontally or inclined. This particularly permits, for certain specific applications, the introduction of a rigid facing below the plane of movement of support sheet 13.

Distribution plate 21 and calibrating bar 22 are preferably mounted between the longitudinal members 30 of a second chassis, which is connected to the first chassis by means of pivot shafts 31 connecting the longitudinal members 30 of the second chassis to the longitudinal members 23 of the first chassis. Due to this connection the second chassis, in pivoting about shaft 31, may be adjusted in inclination due to a pair of micrometer screws 32 which screw into the extremities 30a of longitudinal members 30 and bear upon the corresponding upper land portions of longitudinal members 23 of the first chassis. This is done in such manner as to form between said longitudinal members 30 and 23 a wedge of adjustable thickness. Due to this adjustable arrangement it is possible to adjust the thickness E of the calibrating channel formed between the calibrating bar 22 and the reference plate 20 in very fine and precise manner.

Bar 22 preferably takes the form of a square beam whose edges 22a are carefully machined so as to constitute a calibrating lip having a transverse profile which is plane, or better yet curved, as shown in FIG. 2. It will be noted that each of the edges of bar 22 has been machined and these can therefore be used one after the other. This makes it possible to utilize the distributing and calibrating system over a very large number of hours without having to disassemble the bar 22 because it is possible to refinish the laminating lips which are not being used while the system is operating.

The calibrating bar 22 is united to a transverse member 30b of the second chassis positioned above the plane defined by the longitudinal members 30. The bar 22 is connected to the transverse member 30b by means of struts 33 which support the end shafts 34 of bar 22.

In accordance with a preferred structural embodiment of the invention, the distribution plate 21 has an extremity 21a connected by means of brackets 35 to the shafts 34 of the calibrating bar. Thus the lower surface of the distribution plate, adjacent to the calibrating bar 22, is at the same level as the calibrating lip of bar 22 which is being used. The distribution plate is adjustably connected to a transverse member 30c of the second chassis also positioned above the plane passing through the longitudinal member 30. The connection between extremity 21b of the distribution plate and beam 30c is made by means of a series of threaded pins 36 holding the plate 21 suspended at the desired height by the intermediary of adjusting screws 37 bearing against support plates 38 united with transverse beam 30c. Due to this arrangement it is possible to adjust the distribution plate in inclination relative to reference plate 20. This adjustment possibility has proven to be particularly useful, given the extreme sensitivity of the effect of the value of this angle of inclination of this plate upon the calibrating action at the level of bar 22. In accordance with a characteristic embodiment of the present system, the adjusting means which operate upon the transverse profile of the distribution plate consists of micrometer adjusting pins 39. These pins 39 have one extremity connected to the upper face of plate 21 through the intermediary of an attaching plate 40, this plate being itself connected to pin 39 through the intermediary of a shaft 41. Pin 39 has its other extremity controlled by a screw 42 guided within an intermediate transverse member 43 positioned between transverse members 30b and 30c of the second chassis. It will be noted that the intermediary transverse member 43 is positioned relatively closer to transverse member 30b than to member 30c. This makes it possible to obtain well-defined local deformations of the transverse profile of plate 21. It will be understood that, due to this arrangement, it becomes possible to locally deform the transverse profile of the distribution plate 21, and consequently to operate upon the equalization defects of the synthetic material which will visibly appear to those in charge of the manufacturing process. To achieve this result, the distribution plate 21 is made of transparent material. Very good results have been obtained using a glass leaf. In the illustrative embodiment shown, the distribution plate consists of two parallel sheets separated by a space 44 which defines a chamber inside which there can be advantageously circulated a liquid refrigerant. This makes it possible to better control the course of the reaction of the mixture of expandable synthetic material which passes between distribution plate 21 and reference plate 20. Similarly it is desirable to provide in reference plate 20, channel 20a in which there is also circulated a liquid refrigerant. It will further be noted that, to facilitate certain cleaning and maintenance operations, the second chassis can pivot completely around the pivot shaft 31 of the longitudinal member 23 of the first chassis. To this end there is provided a pair of jacks 45, united to beams 25 of the first chassis, the pins 46 of these jacks passing through the beams 25 and the longitudinal members 23 of the first chassis to bear against the lower lands of the longitudinal members 30 of the second chassis.

A continuous manufacturing installation of polyurethane foam panels may comprise, as shown in FIG. 1, following the distribution and calibrating system 19, a pair of continuous conveyor belts 47, 48 positioned respectively above and below the plane of movement of the components of the panel being formed. The active branch 48a of continuous belt 48 may be supported by a rigid plate 49. The active branch 47a of continuous belt 47 may advantageously be maintained applied to the cover sheet 18 of the panel being formed, by means of a flexible mat 50 deformable in all directions and of a mesh structure type.

It will be understood that the invention is not limited to the illustrative embodiment described and shown above of the distribution and calibrating system. Rather other variants and other embodiments thereof will occur without departing from the scope of the appended claims.

I claim:
1. A distributing and calibrating system for liquid reactant mixture for continuous manufacturing installations of panels of expandable synthetic material, in which the expandable synthetic material is delivered by pouring in the liquid state upon a support sheet which may or may not be liquid-tight and which is in continuous movement, said material being preferably delivered by a pouring system comprising plural fixed pouring heads distributed along a line perpendicular to the direction of movement of the support sheet, the said installation further comprising means for applying to the top of the synthetic material delivered by pouring a cover sheet which may or may not be liquid-tight, the support sheet and the cover sheet making it possible to subject the synthetic material to a calibrating action when this material is still present in the liquid state, said system comprising:

a reference plate below the plane of movement of the support sheet upon which said support sheet is displaced, and a distribution plate above the plane of movement of the support sheet and of the cover sheet, said distribution plate being elastically deformable and adjustable in spacing and inclination relative to the reference plate, and said distribution plate being positioned immediately upstream from a calibrating bar which is adjustable in displacement relative to either one of said plates, whereby the material is subjected consecutively to the action of the distribution plate and of the calibrating bar, the distribution plate comprising adjusting means for locally deforming said distribution plate along a line transverse to the direction of movement of the support and cover sheets of the panel being formed, in such manner that said local adjustable deformations of said plate equalize the local excess thicknesses attributable to the pouring lines of said pouring head.

2. The system of claim 1 wherein
the calibrating bar is positioned above the plane of movement of the support sheet and is adjustable in spacing relative to the reference plate.

3. The system of claim 1 wherein
the reference plate on the one hand and the distribution plate and calibrating bar on the other hand are respectively mounted between the longitudinal members of a first chassis connected to a fixed support frame through jacks positioned against said support frame and said longitudinal members of the chassis of the reference plate, the distribution plate and the calibrating bar being mounted suspended between the longitudinal members and the transverse members of the second chassis, said second chassis being connected by pivots to the first chassis, so as to enable adjustment of the angular position of the second chassis relative to the first and thereby obtain adjustment of the distance which separates the calibrating bar from the distribution plate and the distribution plate from the reference plate.

4. The system of claim 3 wherein
the adjustment of the angular position between the second and the first chassis is made through the intermediary of two micrometer stops positioned at the extremity of the longitudinal members of the second chassis opposite the pivots connecting the first and the second chassis, said stops bearing against the corresponding extremities of the longitudinal members of the first chassis.

5. The system of claim 4 comprising
between the micrometer adjustments, a lifting system for the second pivoting chassis, the lifting system comprising two jacks attached to the longitudinal members of the first chassis so as to act upon the longitudinal members of the second chassis.

6. The system of claim 3 wherein
the distribution plate is connected at one of its transverse extremities to the calibrating bar through the intermediary of connecting brackets capable of oscillating about the suspension shafts of said bar, whereas the other transverse extremity of the distribution plate is connected by the intermediary of adjustment screws positioned between said extremity and the corresponding and transverse member of the second pivoting chassis.

7. The system of claim 3, wherein
the adjusting means for locally deforming the distribution plate comprises micrometer-adjusting pins having one extremity connected to the plate, the other extremity being controlled by a screw guided within a transverse member of the second pivoting chassis, this transverse member being disposed between the extreme transverse members of the same chassis, above the distribution plate.

8. The system of claim 1 wherein
the distribution plate is made of elastically deformable transparent material, preferably glass.

9. The system of claim 1 wherein
the distribution plate comprises two flexible transparent leaves separated by a space which provides a liquid refrigerant circulation chamber.

* * * * *